(12) United States Patent
Lundquist et al.

(10) Patent No.: US 8,498,811 B2
(45) Date of Patent: Jul. 30, 2013

(54) METHOD AND DEVICE FOR INDOOR POSITIONING

(75) Inventors: Christian Lundquist, Linköping (SE); Per Skoglar, Linköping (SE); Fredik Gustafsson, Linköping (SE); David Törnqvist, Linköping (SE); Jonas Callmer, Linköping (SE)

(73) Assignee: Senionlab AB, Linkoping (SE)

( * ) Notice: Subject to any disclaimer, the term of this patent is extended or adjusted under 35 U.S.C. 154(b) by 263 days.

(21) Appl. No.: 12/929,690

(22) Filed: Feb. 9, 2011

(65) Prior Publication Data

US 2012/0203453 A1 Aug. 9, 2012

(51) Int. Cl.
*G01C 21/00* (2006.01)

(52) U.S. Cl.
USPC .......................................... 701/434

(58) Field of Classification Search
USPC .................. 701/434, 489, 512, 540
See application file for complete search history.

(56) References Cited

U.S. PATENT DOCUMENTS

| | | | |
|---|---|---|---|
| 5,959,575 A | 9/1999 | Abbott | |
| 6,323,807 B1 * | 11/2001 | Golding et al. | 342/419 |
| 6,522,266 B1 * | 2/2003 | Soehren et al. | 340/988 |
| 6,546,336 B1 * | 4/2003 | Matsuoka et al. | 701/472 |
| 6,574,550 B2 | 6/2003 | Hashida | |
| 7,511,662 B2 | 3/2009 | Mathews et al. | |
| 7,761,233 B2 | 7/2010 | Schott et al. | |
| 2002/0193940 A1 | 12/2002 | Hashida | |
| 2005/0197769 A1 * | 9/2005 | Soehren et al. | 701/220 |

(Continued)

FOREIGN PATENT DOCUMENTS

| | | |
|---|---|---|
| EP | 1760487 A1 | 3/2007 |
| EP | 2177928 A1 | 4/2010 |

(Continued)

OTHER PUBLICATIONS

Kemppi, P.; Rautiainen, T.; Ranki, V.; Belloni, F.; Pajunen, J.; , "Hybrid positioning system combining angle-based localization, pedestrian dead reckoning and map filtering," Indoor Positioning and Indoor Navigation (IPIN), 2010 International Conference on , vol., No., pp. 1-7, Sep. 15-17, 2010.*

(Continued)

*Primary Examiner* — Khoi Tran
*Assistant Examiner* — Adam Mott
(74) *Attorney, Agent, or Firm* — Miller, Matthias & Hull LLP

(57) ABSTRACT

The present invention relates to a method for positioning a user inside a building, wherein the user has a user carried device (100) and the user carried device (100) is provided with a direction sensor (110) and a movement sensor (110). The method comprises the steps of providing the user carried device with a vector map (220) of the building, wherein the vector map (220) comprises vectors and nodes representing possible movement paths for the user in the building; determining a starting point in the vector map representing a first position of the user; receiving movement information from the movement sensor (110) regarding movement of the user in the building; receiving direction information from the direction sensor (110) regarding the direction of the movement of the user; and estimating a new position of the user based on the vector map, the movement information and the direction information.

16 Claims, 4 Drawing Sheets

U.S. PATENT DOCUMENTS

| | | | |
|---|---|---|---|
| 2006/0116818 A1* | 6/2006 | Chao et al. | 701/211 |
| 2007/0018890 A1* | 1/2007 | Kulyukin | 342/357.14 |
| 2007/0257831 A1* | 11/2007 | Mathews et al. | 342/22 |
| 2008/0004796 A1* | 1/2008 | Schott et al. | 701/201 |
| 2008/0180637 A1 | 7/2008 | Kjeldsen et al. | |
| 2009/0177437 A1* | 7/2009 | Roumeliotis | 702/150 |
| 2009/0228201 A1 | 9/2009 | Liu | |
| 2009/0265104 A1 | 10/2009 | Shroff | |
| 2011/0087431 A1* | 4/2011 | Gupta et al. | 701/207 |
| 2011/0106487 A1* | 5/2011 | Kourogi | 702/142 |
| 2012/0028654 A1* | 2/2012 | Gupta et al. | 455/456.3 |

FOREIGN PATENT DOCUMENTS

| | | |
|---|---|---|
| WO | WO-0239063 A1 | 5/2002 |
| WO | WO-2009021068 A1 | 2/2009 |
| WO | WO-2009088650 A1 | 7/2009 |
| WO | WO-2010004081 A1 | 1/2010 |
| WO | WO-2010105934 A1 | 9/2010 |

OTHER PUBLICATIONS

Jiménez, A.R.; Seco, F.; Prieto, J.C.; Guevara, J.; , "Indoor pedestrian navigation using an INS/EKF framework for yaw drift reduction and a foot-mounted IMU," Positioning Navigation and Communication (WPNC), 2010 7th Workshop on , vol., No., pp. 135-143, Mar. 11-12, 2010.*

Gustafsson, F.; Gunnarsson, F.; Bergman, N.; Forssell, U.; Jansson, J.; Karlsson, R.; Nordlund, P.-J.; , "Particle filters for positioning, navigation, and tracking," Signal Processing, IEEE Transactions on , vol. 50, No. 2, pp. 425-437, Feb. 2002.*

Woodman et al., "Pedestrian Localisation for Indoor Envrionments", UbiComp '08, Sep. 21-24, 2008, Seoul, Korea, pp. 114-123.

Foxlin, Eric, "Pedestrian Tracking with Shoe-Mounted Inertial Sensors", IEEE Computer Graphics and Applications, Nov./Dec. 2005, pp. 38-46.

Godsill et al., "Monte Carlo smoothing for non-linear time series", Journal of the American Statistical Association, Mar. 2004, vol. 99, No. 465, pp. 156-168, doi: 10.1198/016214504000000151.

Fredrik Gustafsson, "Particle Filter Theory and Practice with Positioning Applications," IEEE A&E Systems Magazine, vol. 25, No. 7, pp. 53-81 (Jul. 2010).

* cited by examiner

METHOD AND DEVICE FOR INDOOR POSITIONING

TECHNICAL FIELD

The present disclosure relates to a method and a device for positioning of a user inside a building.

BACKGROUND

Traveling has always been important for people and there has always existed a need to find destinations smoothly, easily and time efficiently. The demand is emphasized by the enormous success the Global Positioning System (GPS) imply to find a desired destination. The problem with today's global navigation satellite systems (GNSS) is that they only work outdoors and that the destination only can be entered to a building. The reason is that the GNSS satellite signals are weak and cannot enter buildings. When it comes to larger buildings such as airports, university campus, hospitals or shopping malls, the need to find a desired destination within the building remains. A traveler can thus easily find an airport, but does not get any help to find his terminal or gate. To solve this problem and create an overall solution that helps persons to find their desired destination smoothly and easily within a building implies a time saving potential not only for the user but also for the building owner, facility manager, operating body or employee, that does not need to wait for a late person. Further, when first responders are called using mobile phones, the operator will automatically get the caller position using GPS. Since this is not possible indoors, a first responder action sometimes gets delayed due to an uncertain victim position.

U.S. Pat. No. 5,959,575 describes an indoor GPS based navigation method, where ground transceivers transmit pseudo satellite signals in the building. Other solutions are based on radio frequency transmitters, which signals are utilized to triangulate the user's position. All available solutions have in common that they require that the buildings are equipped with some sort of infrastructure (e.g. transmitters) and that these are calibrated manually, which is costly and time consuming. In such solutions, the building structure may be used as a map to exclude impossible motion paths that pass walls and other building structures.

To use the building structure as a map has several disadvantages. The position along a motion track is calculated with an uncertainty. The computed motion track may then look shaky to the user, since the calculated position points seldom resemble a straight line even if the user moves straight ahead most of the time. Further, using dead reckoning supported by a map the position estimate will commonly get stuck in corners or other parts of the building due to heading errors that cause the position estimate to drift off. Further, building maps have no standardized data format in contrast to other geographical information systems (such as street maps, sea charts, elevation maps etc), which uses a vector based format. Further, the building maps require a lot of disk space, since they are normally represented as bit-mapped images. It thereby might become a problem to store the building maps in e.g. a hand held device.

In another solution, the user's position is identified by comparing the signal strength from at least one transmitter received by e.g. a hand held device with a predetermined signal strength map. The production of a signal strength map is time consuming and costly, since the signal strength and the positions at which it is recorded must be determined manually and cover the whole building. Furthermore, if the signal strength is changed, e.g. one transmitter is out of order or it is moved, or e.g. a door is open or closed, the predetermined signal strength map must be recalibrated or it will result in positioning problems.

A method to navigate in an indoor environment, by first manually producing a map model by acquiring physical conditions with passive sensors in a number of known positions, and then measure the same physical conditions at unknown positions and compare with the map model, is presented in U.S. Pat. No. 6,323,807.

Consequently, there is a need for a method of positioning a user inside a building that does not require a time consuming production of a signal strength map or costly additional infrastructure in the building.

SUMMARY

It is an object of the present invention to provide an improved solution that alleviates the mentioned drawbacks with present devices. Furthermore, it is an object to provide a method for positioning a user inside a building, and a user carried device for positioning the user inside the building.

According to a first aspect of the invention, this is achieved by a method for positioning a user inside a building, wherein the user has a user carried device and the user carried device is provided with a direction sensor and a movement sensor. The method comprises the steps of providing the user carried device with a vector map of the building, wherein the vector map comprises vectors and nodes representing possible movement paths for the user in the building; determining a starting point in the vector map representing a first position of the user; receiving movement information from the movement sensor regarding movement of the user in the building; receiving direction information from the direction sensor regarding the direction of the movement of the user; and estimating a new position of the user based on the vector map, the movement information and the direction information.

A complete map of a building structure may contain a large amount of information. A building structure map may be provided in the format of a digital image file, which may need a large digital storing space. By using a vector map showing the possible motion paths of a user inside a building, instead of the building structure that shows impossible motion paths, a lower amount of information may be needed for the vector map compared with the building structure map. This may be advantageous since by restricting the possible directions the user can move, the position errors due to limited heading errors may be removed. The problem of the position estimation drifting away and getting stuck due to the common heading errors is thereby solved. Position estimation along a vector is one-dimensional, which may provide a simpler estimation step compared with a method with two-dimensional position estimation. A calculation algorithm with a one-dimensional vector may be simpler than a calculation algorithm with a two-dimensional input. The one-dimensional vector may further provide a more precise position estimation. The vector map may be advantageous when communicating the map to the user carried device, or storing the map in the user carried device. A vector map file may be of less size than a building structure image file. By using a method for positioning a user inside a building according to the invention, no additional infrastructure is needed in the building. The position is estimated using existing sensors in the user carried device and a vector map. Information of for instance signal transmitters and their properties may not need to be known. Thereby, the method may not be dependent of changes in the signal properties. Further, when calculating positions of the user along a vector instead of along "free space" within building structure boundaries, a straighter motion path may be achieved when the user moves in the building. Due to uncertainty in the calculation, position estimation with only building structure as boundary may provide a curved motion path even though the user walks in a straight line. By estimating the position of the user along a vector, a straight motion path may still be achieved. The starting point may be a previously estimated position, or it may be determined by receiving a positioning signal, such as a GPS signal, before entering the building. The starting position may further be determined by the user stating its starting position to the user carried device. A further way of determining the starting position of the user and the user carried device may be for the user carried device to determine a previous motion pattern of the user along vectors and nodes in the vector map. At one point the motion pattern of the user may only correspond to a single path in the vector map. The user carried device may thereby determine the present position of the user, which position may state the starting position in the method of positioning the user inside the building. The user may be a pedestrian walking in the building.

In one embodiment, the step of estimating a new position may comprise calculating a plurality of possible new positions in the vector map, each having a weight, and calculating a weighted average position, representing the estimated new position, based on the plurality of possible positions and their weights.

The plurality of possible new positions may be calculated based on the movement information and the direction information. The plurality of possible positions may get a weight depending on previous and new information from the sensors. By calculating a plurality of possible new positions, a greater accuracy of the estimated new position may be achieved. The weighted average position may be a position calculated as a mean position out of the plurality of possible position and their weights. The weights of the plurality of possible positions may be a probability weight. The weighted average position may also be a most probable position. The most probable, new position may be achieved despite uncertainty in the sensor information. The weighted average position may be a position on or separated from a vector in the vector map. The weight may be calculated or otherwise provided to the user carried device. The weighted average position may be calculated for displaying a position to the user at the display of the user carried device. The plurality of possible positions and their weights may be used for calculating a new position in the step of estimating a new position.

In another embodiment, the method may further comprise a step of providing the user carried device with a property map comprising a map of physical properties in the building, such as radio frequency signals, magnetic field or light intensity, wherein the physical properties are detectable by the user carried device.

Thereby, additional properties besides movement and direction may be used to calculate the new position. Properties that are detectable by the user carried device may be used to create a property map that may be used together with the vector map to calculate the new position. The use of the property map may refine the position calculation. The properties may be based on radio frequency signals from radio transmitters, such as wireless network transmitters. Other properties that may be used to create the property map are magnetic field, air pressure, barometric pressure, chemical gradients, light intensity or color spectrum. For instance, a magnetometer may detect disturbances in the earth magnetic field at a certain position in the building.

In a further embodiment, the step of estimating the new position of the user further may comprise comparing physical properties in the building detected by the user carried device with the property map.

A detected property, such as a detected radio frequency signal, at a certain position in the building may be compared with the property map. If the same property has been detected before, by for instance another user, the property may be present in the property map at that position. The present position may thereby be estimated based on a presently detected property compared with a previously detected property in the property map. This information may be fused into the position estimation based on the movement information and the direction information.

In a yet further embodiment, the step of providing the user carried device with a property map may comprise a step wherein information regarding physical properties at certain locations in the building is received by the user carried device from a database comprising information regarding physical properties in the building.

Information for the property map, i.e. information regarding detectable properties in the building and the locations of the properties, may be stored in a database. The user carried device may be in communication with the database. The user carried device may be in wireless communication with the database.

In another embodiment, the method may further comprise the steps of detecting physical properties in the building, and storing information regarding the detected physical properties in a database.

Thereby, the database may store information regarding physical properties in the building detected by a user carried device. The database may store such information from a plurality of user carried devices. Thereby, information regarding the physical properties in the building from a plurality of user carried devices may be used to create a property map for a new user carried device. The property map may thereby gradually be formed and may be changed dynamically. There is no need to manually collect information regarding detectable properties in the building on the forehand. This knowledge may be built up during time when user carried devices are used for positioning a user in the building. Further, the information regarding the physical properties in the building may be changed over time automatically when different user carried devices are used in the building. If a property has changed, this may be detected when the detected property at a certain position in the building is compared with the property map. The information in the database may then be updated. The information stored in the database may be; kind of property, a value of that property and the position of the detected property.

In one embodiment, the method may further comprise a step of displaying the estimated new position for the user as a position along a vector in the vector map.

The user carried device may be provided with a display unit on which the estimated position may be displayed. A map of the building may be provided on the display unit, and the estimated position may be illustrated on that map. The representation of the estimated position on the map may be along a vector or on a node in the vector map. The displayed map may be another map than the vector map. By illustrating the position along a vector, the motion path in the map may follow a predetermined line. Due to uncertainty in the sensors and in the calculation of the new position, the calculated motion path may not be as straight as the actual motion path of the user. By connecting the estimated position to a vector or node in the vector map, a straighter and more precise estimation may be provided to the user.

According to a second aspect of the invention, a user carried device for positioning a user inside a building is provided, the user carried device comprising a direction sensor and a movement sensor, wherein the user carried device is provided with a vector map comprising vectors and nodes representing possible movement paths for the user in the building. The movement sensor is adapted to provide movement information regarding movement of the user in the building and the direction sensor is adapted to provide direction information regarding the direction of the movement of the user. The user carried device comprises a calculation unit that is adapted to, based on a starting point in the vector map representing a first position of the user, estimate a new position of the user based on the vector map, the direction information and the movement information.

A complete map of a building structure may contain a large amount of information. A building structure map may be provided in the format of a digital image file, which may need a large digital storing space. By using a vector map showing the possible motion paths of a user inside a building, instead of the building structure that shows impossible motion paths, a lower amount of information may be needed for the vector map compared with the building structure map. This may be advantageous when communicating the map to the user carried device, or storing the map in the user carried device. A vector map file may be of less size than a building structure image file. By using a user carried device for positioning a user inside a building according to the invention, no additional infrastructure may be needed in the building. The position may be estimated using existing sensors in the user carried device and a vector map. Information of for instance signal transmitters and their properties may not need to be known. Thereby, the device may not be dependent of changes in the signal properties. Further, when calculating positions of the user along a vector instead of along "free space" within building structure boundaries, a straighter motion path may be achieved when the user moves in the building. Due to uncertainty in the calculation, a position estimation with only building structure as boundary may provide a curved motion path even though the user walks in a straight line. By estimating the position of the user along a vector, a straight motion path may still be achieved as well as more accurate position estimation. A position estimation along a vector is one-dimensional, which may provide a simpler estimation step compared with a device with two-dimensional position estimation. A calculation algorithm with a one-dimensional vector may be simpler than a calculation algorithm with a two-dimensional input. The one-dimensional vector may further provide a more precise position estimation. The starting point may be a previously estimated position, or it may be determined by receiving a positioning signal, such as a GPS signal, before entering the building. The starting position may further be determined by the user stating its starting position to the user carried device. A further way of determining the starting position of the user and the user carried device may be for the user carried device to determine a previous motion pattern of the user along vectors and nodes in the vector map. At one point the motion pattern of the user may only correspond to a single path in the vector map. The user carried device may thereby determine the present position of the user, which position may state the starting position when estimating the position of the user inside the building. The user may be a pedestrian walking in the building.

In one embodiment, the calculation unit may be adapted to calculate a plurality of possible new positions in the vector map, each with a weight, and to calculate a weighted average position, representing the estimated new position, based on the plurality of possible positions and their weights.

The plurality of possible new positions may be calculated based on the movement information and the direction information. The plurality of possible positions may get a weight depending on previous and new information from the sensors. By calculating a plurality of possible new positions, a greater accuracy of the estimated new position may be achieved. The most probable, new position may be achieved despite uncertainty in the sensor information. The weighted average position may be a position on or separated from a vector in the vector map.

In another embodiment, the user carried device may comprise a transceiver unit in wireless communication with a central unit, and wherein the user carried device is adapted to receive the vector map from the central unit.

Thereby, the vector map may not need to be stored in the user carried device before the user enters the building. The vector map may be sent to the user carried device from the central unit.

In yet another embodiment, the user carried device may be adapted to receive a property map comprising a map of physical properties in the building detectable by the user carried device.

Thereby, additional properties besides movement and direction may be used to calculate the new position. Properties that are detectable by the user carried device may be used to create a property map that may be used together with the vector map to calculate the new position. The use of the property may refine the position calculation. The properties may be based on radio frequency signals from radio transmitters, such as wireless network transmitters. Other properties that may be used to create the property map are magnetic field, air pressure, barometric pressure, chemical gradients, light intensity or color spectrum. For instance, a magnetometer may detect disturbances in the earth magnetic field at a certain position in the building.

In a further embodiment, the user carried device may be adapted to compare physical properties in the building detected by the user carried device with the property map in order to estimate the new position of the user in the vector map.

A detected property, such as a detected radio frequency signal, at a certain position in the building may be compared with the property map. If the same property has been detected before, by for instance another user, the property may be present in the property map at that position. The new position may thereby be estimated based on a present detected property compared with a previous detected property in the property map. This information may be fused into the position estimation based on the movement information and the direction information.

In one embodiment, the user carried device may be provided with at least one sensor for detecting physical properties in the building, and wherein the user carried device may be adapted to provide information about the detected physical properties to a database.

Thereby, the database may store information regarding physical properties in the building detected by a user carried device. The database may store such information from a plurality of user carried devices. Thereby, information regarding the physical properties in the building from a plurality of user carried devices may be used to create a property map for a new user carried device. The property map may thereby gradually be formed and may be changed dynamically. There is no need for a central knowledge about all detectable properties in the building on the forehand. This knowledge may be built up during time when user carried devices are used for positioning a user in the building. Further, the information regarding the physical properties in the building may be changed over time automatically in the database when different user carried devices are used in the building. If a property has changed, this may be detected when the detected property at a certain position in the building is compared with the property map. The information in the database may then be updated. The information stored in the database may be; kind of property, a value of that property and the position of the detected property.

In another embodiment, the user carried device may comprise a display unit that may be adapted to display the estimated new position for the user as a position along a vector in the vector map.

The user carried device may be provided with a display unit on which the estimated position may be displayed. A map of the building may be provided on the display unit, and the estimated position may be illustrated on that map. The representation of the estimated position on the map may be along a vector or on a node in the vector map. By illustrating the position along a vector, the motion path in the map may follow a predetermined line. Due to uncertainty in the sensors and in the calculation of the new position, the calculated motion path may not be as straight as the actual motion path of the user. By connecting the estimated position to a vector or node in the vector map, a straighter and more precise estimation may be provided to the user.

In a further embodiment, the direction sensor may comprise a magnetometer.

The magnetometer may detect the earth magnetic field to determine the direction of the user carried device. The magnetometer may thereby function as a compass. The direction sensor may further comprise a gyro. The gyro may together with the magnetometer determine the direction of the user carried device. The gyro may function as a verification of the direction determined by the magnetometer. The direction sensor may comprise an inertial sensor.

In one embodiment, the movement sensor may comprise an accelerometer.

The accelerometer may be adapted to detect steps taken by the user carrying the user carried device. The movement sensor may thereby be a step sensor. The movement sensor may be any inertial sensor.

BRIEF DESCRIPTION OF THE DRAWINGS

The invention will in the following be described in more detail with reference to the enclosed drawings, wherein.

DESCRIPTION OF EMBODIMENTS

Figure 1:
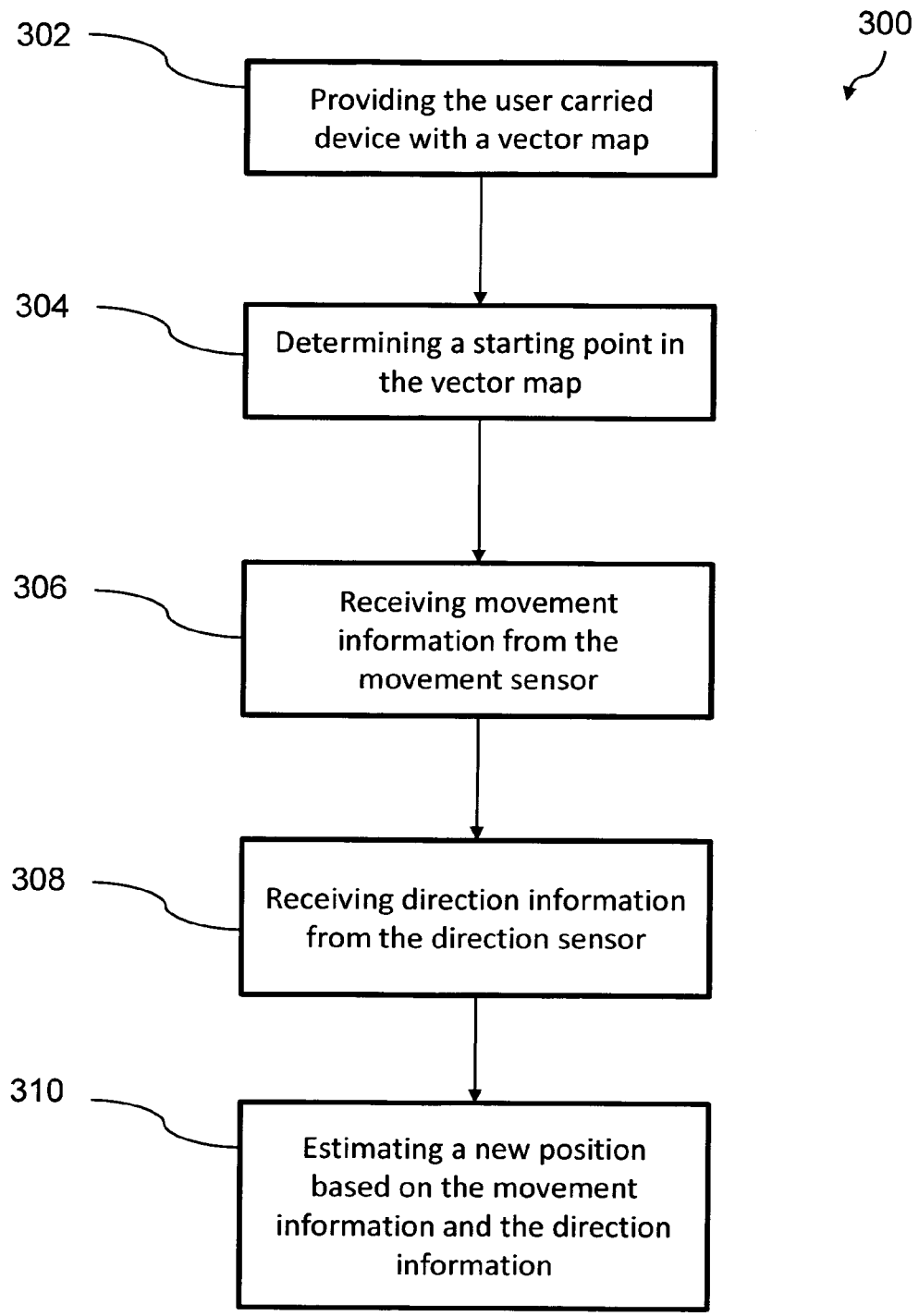
FIG. 1 shows a schematic flow chart according to an embodiment of the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

DEFINITIONS

Navigation: Navigation is in the present text understood to concern the optimal path from point A to point B, where optimal for example can be the nearest or fastest path.

Positioning: Positioning is in the present text understood to concern determining a position in relation to a fixed reference.

Vector map: An indoor map representing paths where it is possible to walk. The vector map consists of vectors and nodes.

Property map: A map describing the physical and measurable properties and characteristics in every position of a building.

As illustrated in FIGS. 1-4, the present invention relates to a method 300 for indoor positioning of a user without use of global positioning systems. An algorithm is aimed to be executed in a user carried device 100, embodied as a hand held or wearable device, such as a smart phone (e.g. iPhone, Android-based phone etc). The device 100 is equipped or connected to at least one sensor 110, such as e.g. accelerometer, magnetometer, gyro and radio frequency receiver.

The method 300 first comprises the step 302 of providing the user carried device 100 with a vector map 220.

The invention relies on a new format for a building map which is tailored for indoor positioning and navigation. Rather than showing building structures which are impossible to pass, it stores paths which are possible to follow. The vector map 220 resembles paths, where corridors are represented with a vector 221 (link) in the center of the corridor, and open spaces with typical passages. The vectors 221 (links) are connected in nodes 222 (junctions). This gives a compact data format that fits standard formats for maps. Algorithms based on this map format gives smooth and natural motion paths easily interpreted by the user.

Further, this map format allows a simpler and more efficient implementation of positioning algorithms based on dead-reckoning. One embodiment is based on a filter using a step detector 101 and a magnetometer 102 as its main inputs. The steps are integrated along the vectors in the map, and the magnetometer is used to conclude which of the multiple choices in nodes that are followed.

A further step 304 in the method 300 comprises determining a starting point in the vector map 220. The starting point represents a first position of the user in the vector map. Further, in step 306, movement information is received from a movement sensor 101 (e.g. an accelerometer) in the user carried device 100. The movement information regards movement of the user in the building. The movement information could be step detection of the steps of the user. In step 308 direction information is received from a direction sensor 102 (e.g. a magnetometer or gyro) in the user carried device 100. The direction information regards the direction of the movement of the user. The direction sensor 102 could be a compass. In step 310, a new position of the user in the vector map is estimated based on the movement information and the direction information from the sensors 110.

Figure 2:
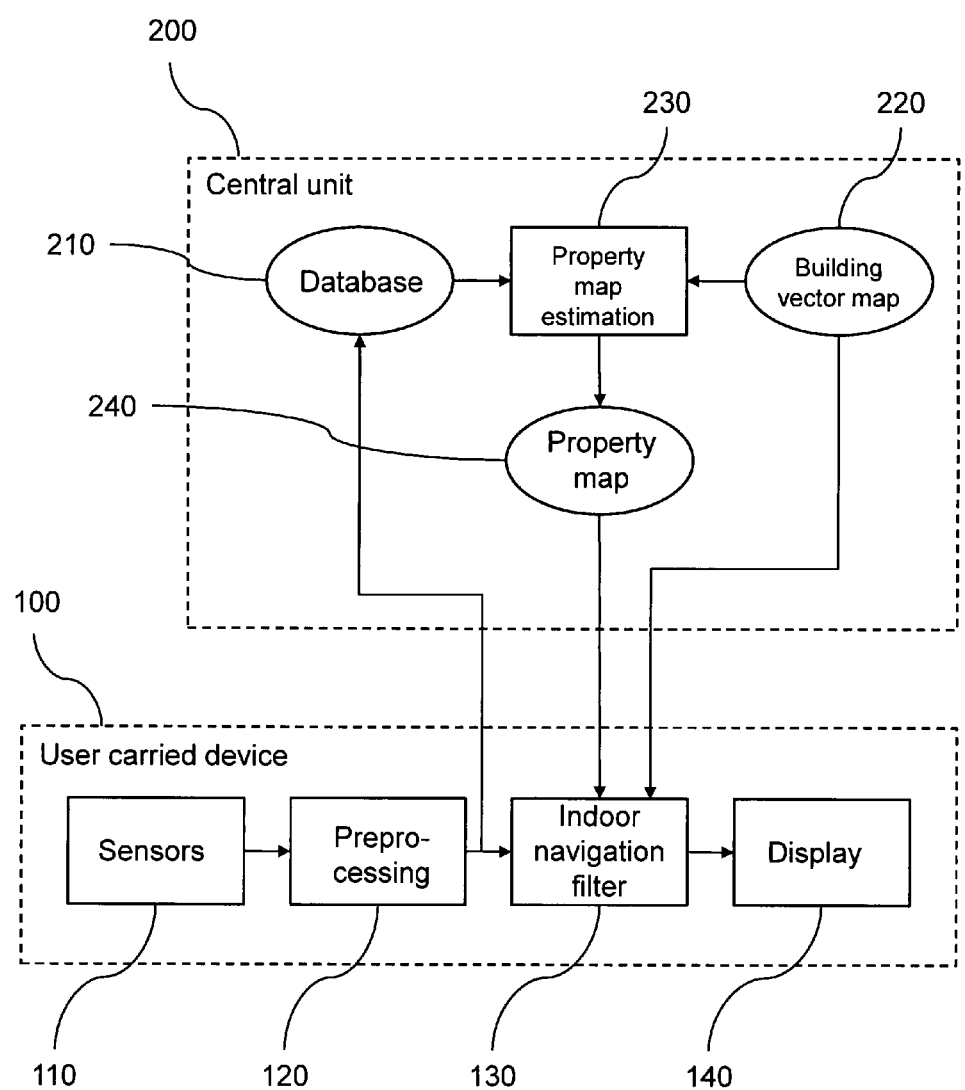
FIG. 2 shows a schematic block diagram of a user carried device and a central unit according to an embodiment of the invention.

As illustrated in FIG. 2, the user carried device 100 is connected to a central unit 200. The user carried device 100 comprises sensors 110 and a display 140 for displaying a representation of the present position of the user.

One more detailed embodiment applies a particle filter 130. It contains a large number of hypotheses, called particles, of the current position in the vector map, and each particle is moved according to the step detector and compass information, and the vector map 220 is used to conclude which of the particles that performs best in a statistical sense.

A filter 130 computes the position based on current and old information. A further part of the invention is based on smoothing, which in contrast to a filter 130 also uses future information. This is particularly useful for creating a property map 240. In fact, the filter or smoothing algorithm is the enabler for more advanced solutions:

1. First, the property maps 240 are created by users having this smoothing (or filter) solution.
2. Then, these users can later benefit from this property map 240 by more accurate and robust positioning.
3. Even more importantly, other users without this algorithm can be located by the created property maps 240 using the standard idea of fingerprinting.

In a further embodiment, the property map 240 is adaptive, where the user reported properties are averaged with a forgetting over time.

The core of the invention is a fusion framework where the sensor data is fused with the network represented vector map 220. The position estimation is represented using multiple position hypotheses (referred to as particles), each associated with a weight related to the probability of the user being in that position.

The weight is determined by correlating the motion of the user, i.e. walking distance, turning at doorways, entering new corridors etc. with the vector map 220. A weighted mean of all position hypotheses is calculated and indicated to the user.

The network representation of the floor, i.e. the vector map 220, reduces the dimensions of the map and thereby improves the positioning in two ways. First, the positioning system becomes less sensitive to disturbances (e.g. on the magnetic compass) since the possible user movements are restricted. Second, fewer dimensions mean fewer computations and a more robust positioning framework.

Furthermore, besides the vector map 220, a property map 240 may also be considered if it is available. The information of the property map 240 further improves the robustness and accuracy of the positioning algorithm described above, since more map information will produce a more confident position estimate. The production of property maps 240 is described below. The property map 240 may also make it possible to directly estimate the absolute position of the user in the vector map.

A property map 240 is produced on a central unit 200 by collecting measurements from the user carried device 100. The central unit 200 may be a server in wireless communication with the user carried device 100.

The information from the sensors 110 are preprocessed 220 in the user carried device 100.

Processed sensor data from, e.g. accelerometer, gyro, magnetometer or radio frequency receiver etc. are collected by the user carried device and transmitted to a database 210 (e.g. the central unit). A property map 240 is then produced based on the data collected in the database. The first step is to estimate the user's position based on the processed sensor data and the vector map. The estimation process may embody a filter algorithm or a smoothing algorithm. Smoothing is the preferred embodiment which means that the analysis is performed considering all available data at all time instances, i.e. a user's position at a certain time is estimated considering both past and future data. Smoothing can only be performed offline, but improves the positing estimation substantially in comparison with filter methods. The second step is to geo-reference the property data, e.g. received signal strengths, with the result from the smoothing algorithm. The third step 230 is to produce the property map 240 from the geo-referenced property data. This step also includes detecting anomalies or changes to the property map 240.

The more amount of data gathered, e.g. by having many users in the system, more detailed and accurate property maps 240 (embodied as e.g. signal strength maps) over the buildings are automatically produced. The property map 240 can then be transmitted to the user carried device and used as input, alone or besides the vector map 220, to the positioning algorithm mentioned above to give an improved positioning performance.

Only a vector map 220 is required for position estimation, but property maps 240 can be used if available. A vector map 220 can be extracted automatically from the drawing of a building. This automated process is very cheap in comparison with other solutions based on infrastructure.

A property map 240 can be produced automatically if the user carried device 100 can measure at least one suitable property. There is no need for prior information about the infrastructure. For producing a signal strength map according to prior art solutions, the position and identification (ID) of Radio Frequency (RF) transmitters must be known beforehand. In the present solution the user based process of producing a property map includes the identification of RF signal strength and the transmitter's ID.

A dynamic and automatic map production and calibration is provided according to this method of producing a property map 240. If a signal strength changes, the maps 240 will be updated automatically.

A battery powered smart phone where cheap, but yet competent, sensors such as accelerometer, magnetometer, gyroscopes and/or radio frequency receivers are integrated is an example of a suitable user carried device 100.

The standard positioning approach is to use the global navigation satellite system called GPS (Global Positioning System). However, GPS relies on weak radio signals and the use in indoor environments is therefore very limited. An alternative positioning approach is to use an inertial navigation system (INS) where the measurements from an inertial measurement unit (IMU), comprising an accelerometer and gyros, are integrated to obtain the position in a dead-reckoning manner. However, this requires very expensive and bulky high performance IMU's to keep the drift at a reasonable level. By mounting the IMU on the foot it is possible to compensate for the drift to some extent since the foot is approximately stationary when it is in contact with the ground. A third positioning alternative is to measure the signal strength of pre-installed and known RF transmitters, for instance WLAN access points. The drawback is a kind of chicken-or-egg problem that must be solved. To be able to do positioning from signal strength measurements a signal strength map is needed, and to make a signal strength map, a positioning system is needed, etc. Thus, some manual and inconvenient work is required to produce the map. Furthermore, extra work is needed when new transmitters are added to the environment.

Our invention is embodied as a positioning method 300 for a person with hand held or wearable sensor equipped device in environments where GPS and prior information about RF signal strengths are not available. Several different sensor configurations are possible. In most cases, sensors with different and complementary characteristics are used and the sensor data is fused to obtain a position estimation. Furthermore, our invention can automatically produce and adapt RF signal strength maps, or other property maps such as air pressure or magnetic field, by using the data collected by the user. These maps can of course be used to improve the positioning performance at a later stage.

The block diagram in FIG. 2 shows an overview of the system. A brief introduction of the two subsystems is first given and then the blocks are described in detailed in the following sections.

Indoor Positioning with a Smart Phone—Overview

Sensor data 110 is entering in the lower left corner and the data is pre-processed 120 to compress the data volume and to extract important features, such as steps of the person. The pre-processed sensor data is the input to a recursive positioning filter 130 where the position of the person is estimated. The position estimation may then be used to plan and guide the user to his or her intended destination.

The position estimation is represented using multiple position hypotheses (referred to as particles), each associated with a weight related to the probability of the user being in that position. The weight is determined by correlating the motion of the user, i.e. walking distance, turning at doorways, entering new corridors etc. with the vector map 220. The filter 130 is using information about the environment represented as a vector map 220 with vectors and nodes. The vector representation of the building reduces the dimensions of the map and thereby improves the positioning. A weighted mean of all position hypotheses may be calculated and may be indicated to the user.

Furthermore, besides the vector map 220, a property map 240 may also be considered if it is available. The information of the property map 240 further improves the robustness and accuracy of the positioning algorithm described above, since more map information will produce a higher confident.

Automatic Property Map Production—Overview

A property map 240 is produced on a central unit 200 by collecting measurements from the user carried device 100. Collected sensor data is pre-processed and transmitted and stored in a database 210. A property map 240 can then be produced based on the data in the database 210. The first step of this process is to estimate the user's position based on the processed sensor data 110, the vector map 220 and a smoothing algorithm. The second step is to geo-reference the property data, e.g. received signal strengths, with the result from the smoothing algorithm. The third step is to produce the property map 240 from the geo-referenced property data.

The more amount of data gathered, the more detailed and accurate property maps 240 over the buildings are automatically produced. The property map 240 can then be used as input, besides the vector map, to the positioning filter algorithm to improve the positioning performance. This automatic map production method can also be used to create property maps 240 of other types of geo-referenced data. If signal strength data in the database, referring to RF transmitters in the building, is used, the property map 240 may be in the form of a signal strength map.

Sensors

The sensors 110 used for positioning may for instance be an accelerometer (preferably three dimensional), a magnetometer (preferably three dimensional), a gyro (preferably three dimensional) and/or a radio frequency receiver. Embodiments of three dimensional sensors are described next.

The accelerometer provides measurements of how the user carried device is accelerating in x-, y- and z-dimensions. The acceleration measurements are used to detect the steps that the user carrying the device 100 is taking.

The magnetometer measures the strength of the geo-magnetic field generated by earth. These measurements are provided in x-, y- and z-dimensions. The measurements are used to estimate the heading of the user carried device 100. The magnetic field is easily disturbed by human structures such as power grids and steel bars.

The gyro measures the angular velocity of the device around the x-, y- and z-dimensions. This provides information about how the user carried device 100 is turning which is used to improve the estimate of the user carried device heading.

The radio frequency receiver collects information about the radio signal environment. It provides the identity of all detectable radio frequency transmitters such as WLAN transceivers and the strength of the radio signal. If the appearance of the radio signal environment is known, this can be used to improve the positioning. If the radio signal environment is not known, the information can be used to estimate the appearance of the radio signal environment.

Pre-Processing

The signal pre-processing 120 uses the sensor data in mainly two ways; to detect steps and to estimate the heading of the user carried device 100. The detected steps are used by the filter 130 to estimate the user's movements and the heading estimation is used to determine the direction in which the movement occurred. These two pieces of information are uploaded to the database 210. This significantly reduces the amount of information to upload compared to sending all sensor data.

Step Detector

The person's steps are detected by considering the three independent acceleration measurements. The periodicity in the sequence caused by the steps is clearly visible. The Euclidian norm of the three acceleration measurements provides a clear peak in the signal during each step which is readily detected.

The steps occur at a very characteristic frequency, making it possible not only to detect the steps but also to estimate the length of the steps. These estimations can be further improved by combining the information from all three (x, y, z) independent accelerometers.

Heading Estimation

The heading is estimated using the magnetometer 102. First the orientation of the phone has to be estimated using the three dimensional magnetometer data and the gravitation vector in the acceleration data. This provides information about which part of the phone that point towards north and which part that point towards east. Thereafter, the heading of the phone can be determined. The magnetometer signals suffer though from significant disturbances due to structural interference.

If three dimensional gyro measurements are available, the heading estimation can be supported by angular velocity measurements for improved accuracy. The gyro measurements are used to estimate the changes in heading over a shorter period of time. There is though an uncertainty in the gyro measurements, causing the heading estimate to drift. The key is to use the magnetometer measurements to correct the heading changes measured by the gyros, but only when the magnetometer data is deemed reliable.

Errors in the magnetometer data are detected using the gyro data. If the changes in heading measured by the magnetometers are consistent with the changes measured by the gyros over an extended period of time, the heading measurements are deemed reliable and are used to update the heading estimation.

If no magnetometer is available or magnetic disturbances are present, the gyro can be used to determine the heading. The estimated heading drift can be reduced by fusing the gyro measurements with the vector map.

Indoor Navigation Filter 130

Examples of inputs to the navigation filter are:
1. Step data, heading and vector map 220.
2. Step data, heading, vector map 220, received signal strength and received signal strength-map.
3. Received signal strength and received signal strength-map (property map 240).

Received signal strength and received signal strength-map can be replaced by one or more geo-varying properties and corresponding property maps 240.

The output from the navigation filter 130 may be the first statistical moment of the position estimation, i.e. the mean value. The uncertainty may be represented by a covariance of the position.

Figure 3:
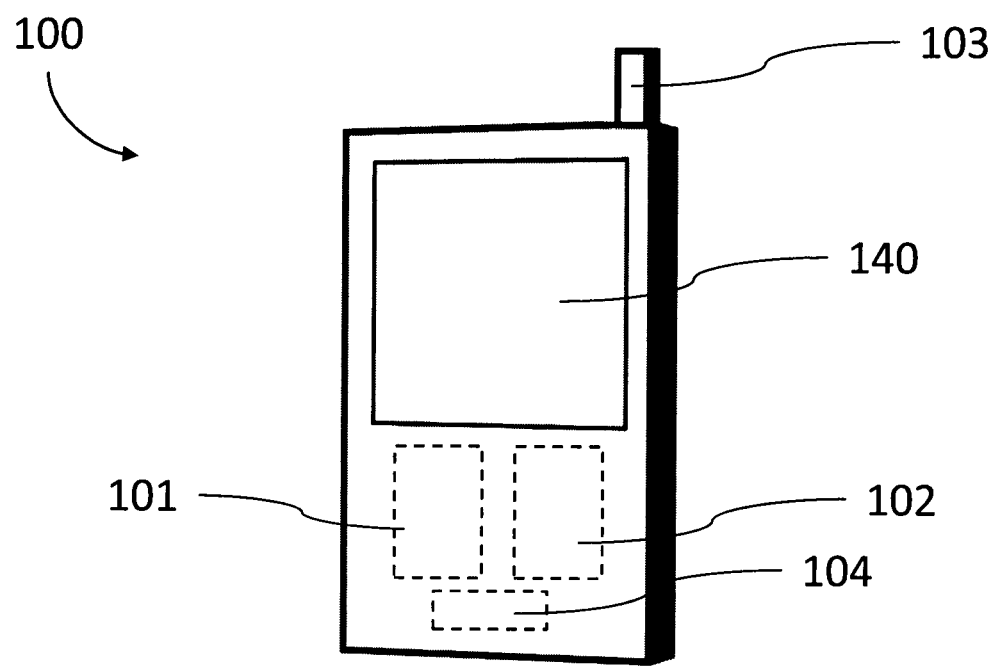
FIG. 3 shows a schematic perspective view of a user carried device according to an embodiment of the invention.

As illustrated in FIG. 3, the user carried device 100 comprises a movement sensor 101, a direction sensor 102 and a display 140. The user carried device 100 preferably comprises a battery (not shown). The user carried device 100 may further comprise an antenna 103 for communication with the central unit 200. The user carried device 100 further comprises a calculation unit 104. The calculation unit 104 is connected to the movement sensor 101 and the direction sensor 102. The calculation unit 104 is further connected to the display 140 for presenting the estimated position to the user. The calculation unit 104 performs the preprocessing and the filtering and/or smoothing functions as described above. The user carried device 100 may comprise additional sensors (not shown) for detecting other properties in the building. The calculation unit is connected to the antenna 103 for communication with the central unit 200.

Mathematical Model

In this section of the description text a mathematical model, comprising a motion model and a sensor model, is described.

The sensor model describes how the unknown state variable, which in this case is the position of the hand held device, relates to the measurements. The state variable is denoted $x_t$ and the measurements are denoted $y_t$, at time t. More specifically, this relation is modeled as a probability density function, denoted likelihood function, which is conditioned on the state variable according to the notation $p(y_t|x_t) = p_{e_t}(y_t - h(x_t)|x_t)$.

The measurements comprise e.g. the step length, the heading angle and the vector map. The step length and the heading angle are scalar variables and the likelihood function may be approximated by a nonlinear algebraic equation with additive independent identically distributed measurement noise. Nevertheless, the vector map is not that simple to describe as there are high requirements on the flexibility of the model. That is the vector map can only be described by a number of vectors and a probability density function at the current position.

In corridors, the likelihood function is restricted by the one dimensional vectors, and in which direction the user is walking. At nodes (junctions), different possible vectors can be taken and the likelihood for the different possibilities is dependent on the heading angle of the user.

The motion model of the person is modeled with standard techniques, where the Markov transition density $p(x_{t+1}|x_t) = p_{v_k}(x_{t+1} - f(x_t)|x_t)$ is approximated by a difference equation with additive independent identical distributed noise.

The state estimation methods used in the indoor navigation filter is influenced by the Bayesian view, which implies that the solution to the estimation problem is provided by the filtering conditional probability density function (pdf) $p(x_t|y_{1:t})$.

The conditional pdf can be recursively updated in two steps:

Firstly a time update $$p(x_{t+1}|y_{1:t}) = \int_{\Re^2} p_{v_k}(x_{t+1} - f(x_t)|x_t) p(x_t|y_{1:t}) dx_t \quad (1)$$

and secondly a measurement update $$p(x_t|y_{1:t}) = \frac{1}{c} p_{e_t}(y_t - h(x_t)|x_t) p(x_t|y_{1:t-1}) \quad (2)$$

Using these expressions, the conditional probability density function $p(x_t|y_{1:t})$ can be computed recursively at each iteration t given the information in the measurements up to the current iteration, denoted $y_{1:t}$. These equations cannot be evaluated analytically due to the nonlinear nature of the estimation problem, and therefore some type of approximation of the pdf is necessary. One possible implementation is the sequential Monte Carlo filter (SMC), also referred to as the particle filter (PF). Other implementations include the point mass filter (PMF) and the Kalman filter. For a more detailed description of the particle filter, see Gustafsson, F.; "Particle filter theory and practice with positioning applications," *Aerospace and Electronic Systems Magazine, IEEE*, vol. 25, no. 7, pp. 53-82, July 2010 doi: 10.1109/MAES.2010.5546308.

The PF estimates an approximation of the posterior pdf $p(x_t|y_{1:t})$ represented by a number of independent identically distributed samples referred to as particles. The particles in this filter represent hypotheses about the user's position on the building network. The conventional update rate for such a filter is uniform in time; here an update is triggered by a detected step or received signal strength-measurement.

The filter is using information about the environment represented as a vector map with vectors and nodes. The vector representation of the map reduces the dimensions of the map and thereby improves the positioning in two ways. First, the positioning system becomes less sensitive to disturbances (e.g. on the magnetic compass) since the possible user movements are restricted. Second, fewer dimensions means fewer computations and a more robust positioning framework.

Algorithm
1. Initialization
2. Time update, occurs at a detected step or received signal strength-measurement
3. Optional measurement update from heading
4. Optional measurement update from received signal strength
5. Calculate mean and covariance for point estimate
6. Resampling, if necessary
7. Go to step 2.

Initialization

The initial distribution of the particles can be determined in a number of ways. The user might provide information about where he is located. The user might come from outside with a GPS position, saying where he entered the building. If a received signal strength and received signal strength-map is available, it can be used to determine initial position. Furthermore, if the user carried device is equipped or connected with a camera, it may be used to read e.g. office numbers, bar codes or tags, and compare them with numbers stored in a database to identify the current position. In summary, sensor readings are compared with geo-referenced data stored in a database to identify initial condition. A further alternative may be that an initial motion track of the hand held device is compared to the vector map. At one point the motion track of the hand held device only corresponds to one possible track in the vector map. Thereby, the present initial position may be determined.

Time Update

A detected step or received signal strength-measurement triggers a time update of the filter according to equation (1). When a step is detected each particle moves on its vector in the building vector map. The direction of the movement is determined by the heading received from the preprocessing step. The length of the movement is a predefined step-length or an estimated quantity plus random noise generated in the filter. When no step is detected but a received signal strength-measurement is received, the movement is a random walk on the vector. If, in any of the above cases, the user reaches a node in the building vector map the user is randomly assigned to a vector attached to the node. There might be different probabilities for assignment to each vector.

Optional Measurement Update from Heading

If heading is available the weight of each particle is modified based on the likelihood of the heading measurement given the heading of the vector that the particle is on. The measurement update is given mathematically according to equation (2).

Optional Measurement Update from Received Signal Strength

If received signal strength from a transmitter can be measured and this access point exists in the received signal strength-map, this can be used to modify the weights in the particle distribution. The measurement update is given mathematically according to equation (2).

Calculate Mean and Covariance for Point Estimation

To provide the user with an estimation of the position, the Cartesian mean and covariance of the particles are calculated.

Resampling

If the particle distribution has unsuitable properties, e.g., high variance in weights, all or parts of the particles might be resampled.

Vector Map 220

Figure 4:
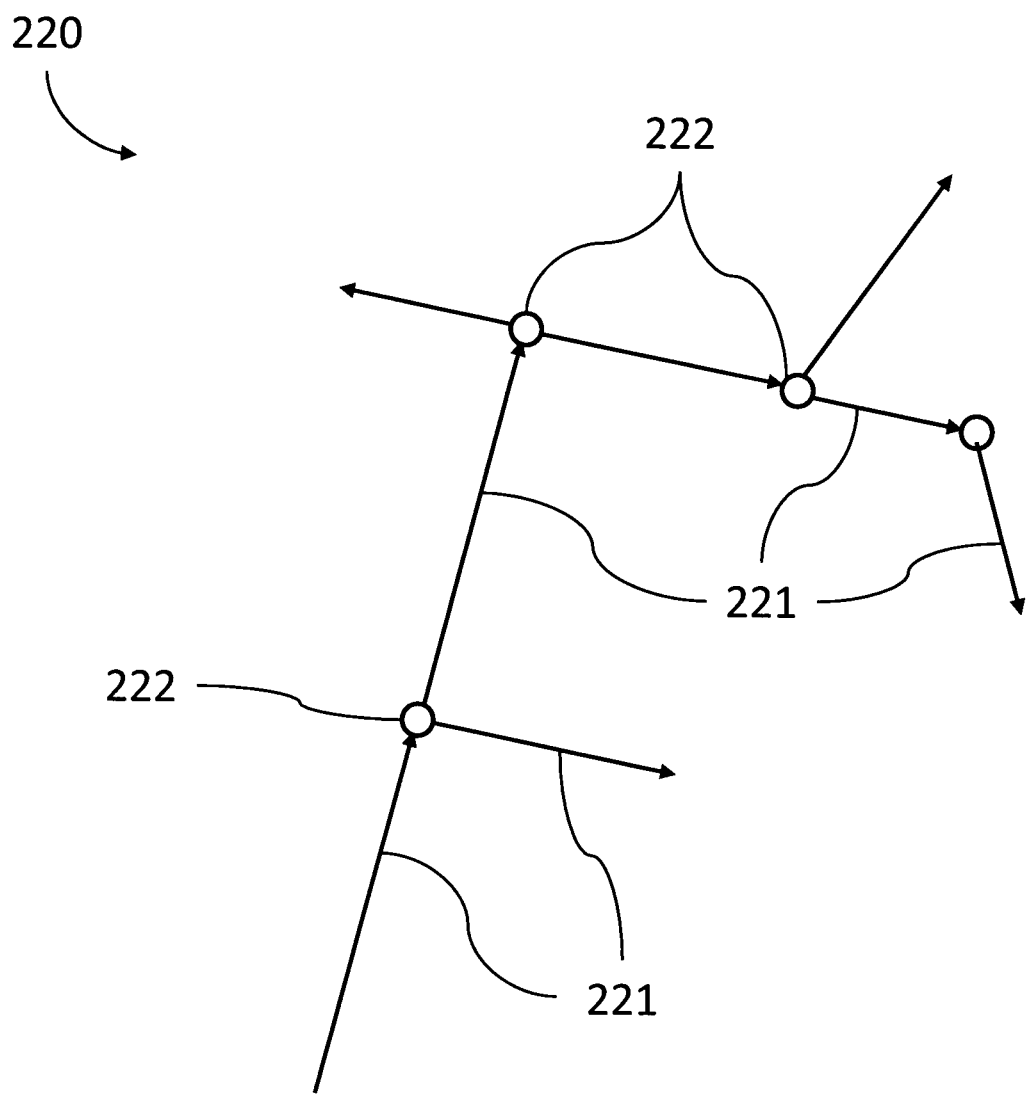
FIG. 4 shows a schematic view of a vector map according to an embodiment of the invention.

The vector map 220 represents the topography of the environment. An example of a vector map 220 is shown in FIG. 4. The vector map 220 contains two data structures comprising the vectors 221 and the nodes 222, respectively. A vector 221 represents a possible route of the person/user and a node 222 connects one or more vectors 221. The vector data structure contains the ID of the vector 221, the information about the position of the vector segments, and two node IDs for the each vector end. The node 222 structure contains the node ID, the location of the node 222 and all connected vector 221 IDs. Thus, the position in the vector map 220 can be described by a discrete mode parameter representing the vector ID and a longitudinal distance from one vector end.

Database 210

The database 210 is connected to internet for quick and easy upload of processed sensor data from the device(s) 100. The database 210 is structured such as it allows efficient database requests from the map estimation process 230.

Property Map 240

A property map 240 is containing geo-referenced data on the vector map 220. Examples of properties are signal strength received from RF transmitters (e.g. from wireless networks such as WLAN), magnetic field strength, color and light intensity measured by a camera or proximity sensor, barometric pressure, chemical gradients in air (e.g. carbon monoxide detectors) etc.

Basically, the property map 240 is a matrix where each column represents one map data point. Each column contains information about the location of the point relative the vector map 220 and information about the property in that point. The size of this information depends on the property, for example, signal strength is a scalar property, but magnetic field is a vector property.

Property Map Estimation 230

In this section the property, without loss of generality, is assumed to be received signal strength. It is straightforward to apply the concept to other properties that are measurable by the device.

The database contains measurements of the received signal strengths with different transmitter IDs. The problem is that this data is not related to locations. The first step is to estimate the trajectory of the device by using the navigation filter described in the section "Indoor navigation filter" above and then apply a particle smoothing method on the filter result, see Godsill et al, "Monte Carlo Smoothing for Nonlinear Time Series", *Journal of the American Statistical Association*, March 2004, Vol. 99, No. 465, pp. 156-168, doi: 10.1198/016214504000000151. Smoothing means that the analysis is performed considering all available data at all time instances, i.e. a user's position at a certain time is estimated considering both past and future data. This can only be done offline, but improves the positing estimation substantially.

The second step is to geo-reference the received signal strength data with the trajectory from the smoothing algorithm. Note that there is noise both in the location data and in the signal strength measurements. The result of this step is smoothed received signal strength data aligned to the vector map 220.

The third step is to derive characteristics of the locations from multiple geo-referred data sets and to produce a map. This step also includes detecting anomalies and removing data that is not consistent. For instance, transmitters that are removed or added must be handled in a robust way. Thus, data acquired recently may be accounted for stronger than old data, to allow dynamic updates of the map.

Navigation and Guidance

Navigation systems are well described in the literature and are not part of the invention. However, the obtained position estimation is used as the current position when calculating the path to the desired destination. Also if the user for any reason decides to not follow the proposed path, this change may be detected and a new path to the desired destination may be computed. Furthermore, the proposed vector map may be used to represent the proposed path to the destination.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. Method for positioning a user inside a building, wherein the user has a user carried device and the user carried device is provided with a direction sensor and a movement sensor, the method comprising the steps of;

providing the user carried device with a vector map of the building, wherein the vector map comprises vectors and nodes representing possible movement paths for the user in the building, determining at the user carried device a starting point in the vector map representing a first position of the user, receiving movement information at the user carried device from the movement sensor regarding movement of the user in the building, receiving direction information at the user carried device from the direction sensor regarding the direction of the movement of the user, and estimating at the user carried device a new position of the user based on the vector map, the movement information and the direction information.

2. Method according to claim 1, wherein the step of estimating the new position comprises calculating a plurality of possible new positions in the vector map, each having a weight, and calculating a weighted average position, representing the estimated new position, based on the plurality of possible positions and their weights.

3. Method according to any of the claim 1 or 2, wherein the method further comprises a step of providing the user carried device with a property map comprising a map of physical properties in the building selected from the group consisting of radio frequency signals, magnetic field and light intensity, wherein the physical properties are detectable by the user carried device.

4. Method according to claim 3, wherein the step of estimating the position of the user further comprises comparing physical properties in the building detected by the user carried device with the property map.

5. Method according to any of the claim 3 or 4, wherein the step of providing the user carried device with the property map comprises a step wherein information regarding physical properties at certain locations in the building is received by the user carried device from a database comprising information regarding physical properties in the building.

6. Method according to any of the preceding claims, wherein the method further comprises the steps of
detecting physical properties in the building, and
storing information regarding the detected physical properties in a database.

7. Method according to any of the preceding claims, wherein the method further comprises a step of displaying the estimated new position for the user as a position along a vector in the vector map.

8. A user carried device for positioning a user inside a building, the user carried device comprising a direction sensor and a movement sensor, wherein the user carried device is provided with a vector map comprising vectors and nodes representing possible movement paths for the user in the building, wherein the movement sensor is adapted to provide movement information regarding movement of the user in the building and the direction sensor is adapted to provide direction information regarding the direction of the movement of the user, and wherein the user carried device comprises a calculation unit that is adapted to, based on a starting point in the vector map representing a first position of the user, estimate a new position of the user based on the vector map representing possible movement paths for the user in the building, the direction information and the movement information.

9. User carried device according to claim 8, wherein the calculation unit is adapted to calculate a plurality of possible new positions, each with a weight, and to calculate a weighted average position, representing the estimated new position, based on the plurality of possible positions and their weights.

10. User carried device according to claim 8, wherein the user carried device comprises a transceiver unit in wireless communication with a central unit, and wherein the user carried device is adapted to receive the vector map from the central unit.

11. User carried device according to claim 8, wherein the user carried device is adapted to receive a property map comprising a map of physical properties in the building detectable by the user carried device.

12. User carried device according to claim 11, wherein the user carried device is adapted to compare physical properties in the building detected by the user carried device with the property map in order to estimate the new position of the user in the vector map.

13. User carried device according to claim 8, wherein the user carried device is provided with at least one sensor for detecting physical properties in the building, and wherein the user carried device is adapted to provide information about the detected physical properties to a database.

14. User carried device according to claim 8, wherein the user carried device is adapted to display the estimated new position for the user as a position along a vector in the vector map.

15. User carried device according to claim 8, wherein the direction sensor comprises a magnetometer.

16. User carried device according to claim 8, wherein the movement sensor comprises an accelerometer.

* * * * *